US011215269B2

(12) United States Patent
Abrahamson

(10) Patent No.: US 11,215,269 B2
(45) Date of Patent: Jan. 4, 2022

(54) TAPPET WITH INNER CUP RECEIVED ON PALLET

(71) Applicant: Koyo Bearings North America LLC, Westlake, OH (US)

(72) Inventor: Scott Abrahamson, Piedmont, SC (US)

(73) Assignee: Koyo Bearings North America LLC, Greenville, SC (US)

( * ) Notice: Subject to any disclaimer, the term of this patent is extended or adjusted under 35 U.S.C. 154(b) by 566 days.

(21) Appl. No.: 16/092,317

(22) PCT Filed: Apr. 14, 2017

(86) PCT No.: PCT/US2017/027616
§ 371 (c)(1),
(2) Date: Oct. 9, 2018

(87) PCT Pub. No.: WO2017/181002
PCT Pub. Date: Oct. 19, 2017

(65) Prior Publication Data
US 2021/0239200 A1 Aug. 5, 2021

Related U.S. Application Data

(60) Provisional application No. 62/323,157, filed on Apr. 15, 2016.

(51) Int. Cl.
F16H 53/06 (2006.01)
F01L 1/14 (2006.01)
F02M 59/10 (2006.01)

(52) U.S. Cl.
CPC ............... F16H 53/06 (2013.01); F01L 1/14 (2013.01); F01L 2305/00 (2020.05); F02M 59/102 (2013.01)

(58) Field of Classification Search
CPC .. F16H 53/06; F16H 53/08; F01L 1/04; F01L 1/14; F01L 1/16; F01L 2305/00; F02M 59/102
See application file for complete search history.

(56) References Cited

U.S. PATENT DOCUMENTS 7,793,583 B2* 9/2010 Radinger ............... F01L 1/143
92/129
8,235,018 B2* 8/2012 Dorn ..................... F04B 53/147
123/90.48
(Continued)

FOREIGN PATENT DOCUMENTS

DE 102017115351 A1 * 1/2019 ............. F02M 59/48
EP 2853697 4/2015
(Continued)

OTHER PUBLICATIONS

Office Action, Korean Patent Application No. 10-2018-7032709, dated Dec. 24, 2019, 21 pages.
(Continued)

Primary Examiner — Adam D Rogers
(74) Attorney, Agent, or Firm — Nelson Mullins Riley & Scarborough LLP

(57) ABSTRACT

A follower mechanism movable within a bore, the mechanism including an outer cup with a substantially cylindrical side wall and a first annular lip portion disposed at a first end of the side wall, an inner cup including a side wall portion defining a pair of shaft apertures and a ledge that is transverse to a longitudinal center axis of the follower mechanism, the inner cup being disposed in the outer cup so that the first annular lip portion of the outer cup abuts a top surface of the side wall portion of the inner cup, a pallet having an outer perimeter, at least a portion of the outer perimeter being adjacent the ledge of the inner cup, a shaft
(Continued)

having a first end and a second end disposed in the shaft apertures, and a roller follower rotatably received on the shaft.

17 Claims, 19 Drawing Sheets

(56) References Cited

U.S. PATENT DOCUMENTS

| | | | | |
|---|---|---|---|---|
| 8,474,427 | B2* | 7/2013 | Dorn | F04B 9/04 |
| | | | | 123/90.48 |
| 8,863,716 | B2* | 10/2014 | Dorn | F04B 53/14 |
| | | | | 123/90.5 |
| 9,644,729 | B2* | 5/2017 | Berruet | F01L 1/14 |
| 9,790,818 | B2* | 10/2017 | Berruet | F16H 53/06 |
| 9,938,945 | B2* | 4/2018 | Dorn | F01L 1/14 |
| 10,718,240 | B2* | 7/2020 | Hauvespre | F01L 1/14 |
| 10,941,737 | B2* | 3/2021 | Abrahamson | F02M 37/04 |
| 2007/0215088 | A1 | 9/2007 | Haefner | |
| 2008/0190237 | A1 | 8/2008 | Radinger et al. | |
| 2012/0080013 | A1* | 4/2012 | Meier | F02M 59/06 |
| | | | | 123/495 |
| 2015/0361937 | A1 | 12/2015 | Geyer et al. | |
| 2019/0368485 | A1* | 12/2019 | Cornett | F02M 59/102 |

FOREIGN PATENT DOCUMENTS

| | | |
|---|---|---|
| JP | H03-294653 A | 12/1991 |
| JP | 2010-511834 A | 4/2010 |
| JP | 2013-217304 A | 10/2013 |

OTHER PUBLICATIONS

PCT International Search Report and Written Opinion dated Oct. 26, 2017 for co-pending International Application No. PCT/US2017/027616.

Extended European Search Report, European Application No. 20160176.2, dated Oct. 7, 2020, 5 pages.

International Preliminary Report on Patentability, PCT/US2017/027616, dated Oct. 16, 2018, 6 pages.

* cited by examiner

TAPPET WITH INNER CUP RECEIVED ON PALLET

RELATED APPLICATIONS

This is a 35 U.S.C. § 371 national stage application of PCT/US2017/027616, filed Apr. 14, 2017, which claims the benefit of U.S. Provisional Patent Application No. 62/323,157 filed Apr. 15, 2016, the entire disclosures of which are incorporated herein.

FIELD OF THE INVENTION

The present invention relates generally to follower mechanisms. More particularly, the present invention relates to designs and assembly methods of follower mechanisms and their associated alignment devices.

BACKGROUND OF THE INVENTION

Follower mechanisms are often used in a valve train of an internal combustion engine to transmit motion from a camshaft of the engine to one or more intake or exhaust valves. As the camshaft rotates, the follower mechanisms receive both a sideways force and a downward force from corresponding lobes on the camshaft, but only transmit the downward force to the valves to open and/or close the valves. Follower mechanisms thereby reduce the possibility of bending or otherwise damaging the valve stems of the valves. As well, follower mechanisms are often used in camshaft driven, high-pressure fuel pumps which are used in gasoline direct injection systems.

Existing bucket-type follower mechanisms typically include either a stamped or cold formed bucket. A roller follower is typically supported on a shaft that is directly fixed to the bucket such as by staking, swaging, etc. As such, the bucket is a load bearing member and, therefore, requires heat treatment and operations such as grinding. As well, follower mechanisms often have some form of alignment device carried in an aperture defined by the bucket such that rotation of the follower mechanism within its corresponding bore is prevented. One example of known alignment devices includes a mushroom-shaped pin that is fixed in an aperture of the follower mechanism's bucket. Such pins can be difficult to manufacture because of their complicated shapes. As well, required heat treatments of the bucket can cause distortion of the aperture which receives the alignment device, thereby complicating assembly. Such alignment devices are often fixed in their corresponding apertures by an interference fit.

The present invention recognizes and addresses considerations of prior art constructions and methods.

SUMMARY OF THE INVENTION

One embodiment of the present disclosure provides a follower mechanism movable within a bore along a longitudinal center axis of the bore, the mechanism including an outer cup having an inner surface and an outer surface defining a substantially cylindrical side wall and a first annular lip portion disposed at a first end of the side wall, an inner cup including a side wall portion defining a pair of shaft apertures and a ledge that is transverse to a longitudinal center axis of the follower mechanism, the inner cup being disposed in the outer cup so that the first annular lip portion of the outer cup abuts a top surface of the side wall portion of the inner cup, a pallet having an outer perimeter, at least a portion of the outer perimeter being adjacent the ledge of the inner cup, a shaft having a first end and a second end, each of the first end and the second end being disposed in a corresponding one of the shaft apertures, and a roller follower rotatably received on the shaft such that a portion of the roller follower extends axially outwardly beyond the first annular lip portion of the outer cup.

Another embodiment of the present disclosure provides a follower mechanism movable within a bore along a longitudinal center axis of the bore, including an outer cup having an inner surface and an outer surface defining a substantially cylindrical side wall, an annular lip portion disposed at a first end of the side wall, and an annular ledge disposed on the inner surface of the side wall, the annular ledge being disposed in a plane that is transverse to a longitudinal center axis of the follower mechanism, a pallet including an outer perimeter, the pallet being disposed in the outer cup such that a portion of the outer perimeter abuts the annular ledge of the outer cup, an inner cup including a side wall defining a pair of shaft apertures, the inner cup being disposed in the outer cup so that a bottom edge of the side wall of the inner cup abuts the pallet and is non-rotatably fixed thereto by the annular lip of the outer cup which abuts an upper surface of the side wall of the inner cup, a shaft having a first end and a second end, each of the first end and the second end being disposed in a corresponding one of the shaft apertures, and a roller follower rotatably received on the shaft such that a portion of the roller follower extends axially outwardly beyond the annular lip portion of the outer cup.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1A:
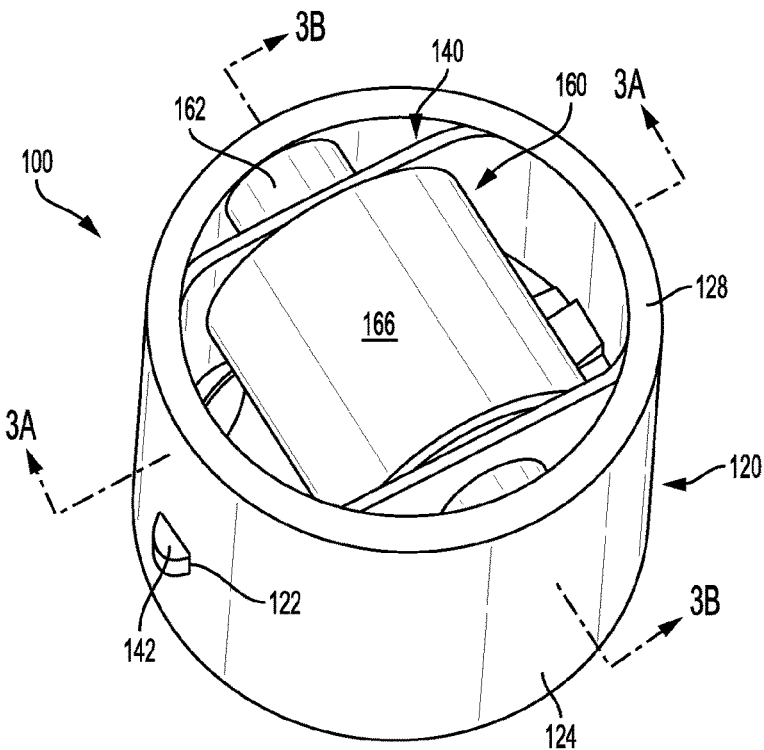
FIGS. 1A and 1B are perspective views of an embodiment of a follower mechanism in accordance with the present disclosure.
Figure 1B:
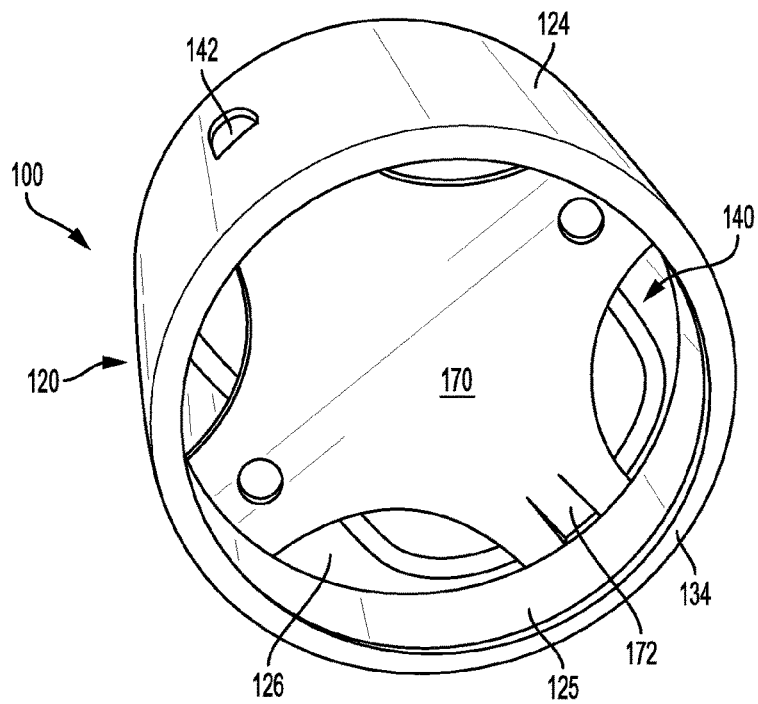

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 7:
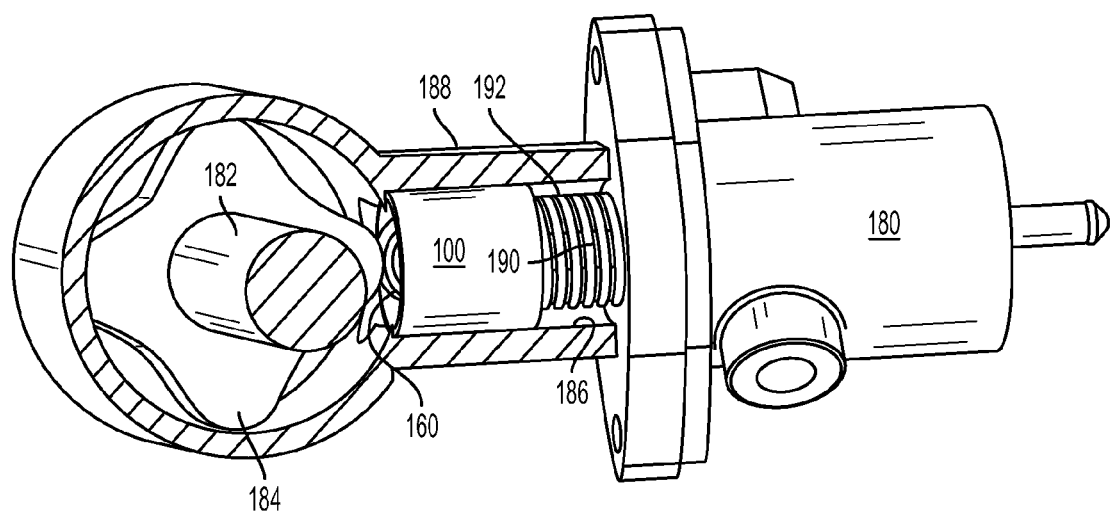
FIG. 7 is a partial cross-sectional view of a high pressure fuel pump including the follower mechanism shown in FIGS. 1A and 1B.

Referring now to the figures, as shown in FIGS. 1A through 3B, an embodiment of a follower mechanism 100 in accordance with the present disclosure includes a substantially cylindrical outer cup 120, an inner cup 140 received therein on a pallet 170, a roller follower 160 supported by inner cup 140, and an alignment device 142 extending through an aperture 122 formed in outer cup 120. As shown in FIG. 7, follower mechanism 100 is used in a high-pressure fuel pump 180 of an internal combustion engine, although other uses for follower mechanism 100 are possible. As a camshaft 182 of the engine rotates, a lobe 184 of camshaft 182, or a rocker arm (not shown) connected to camshaft 186, engages roller follower 160 of follower mechanism 100 to convert the rotational motion of camshaft 182 into linear motion of follower mechanism 100 within a bore 186 of a corresponding cylinder head 188. A pump stem 190 of pump 180 is positioned within and connected to follower mechanism 100 such that, as follower mechanism 100 moves in a linear direction within bore 186, pump stem 190 is alternatingly moved left (as shown) by spring 192 and right by follower mechanism 100. Forces from camshaft 182 are thereby transmitted through follower mechanism 100 to pump 180 such that only forces in substantially the same direction as the motion of pump stem 190 act on pump 180. In addition, follower mechanism 100 serves as a torsional vibration isolation device between camshaft 182 and pump 180 to inhibit rotational forces from being transmitted. As shown, alignment device 142 (FIG. 1A) is an outwardly extending tab defined by pallet 170, a portion of which is slidably received in a correspondingly shaped alignment groove (not shown) defined by the inner wall of bore 186.

Figure 6:
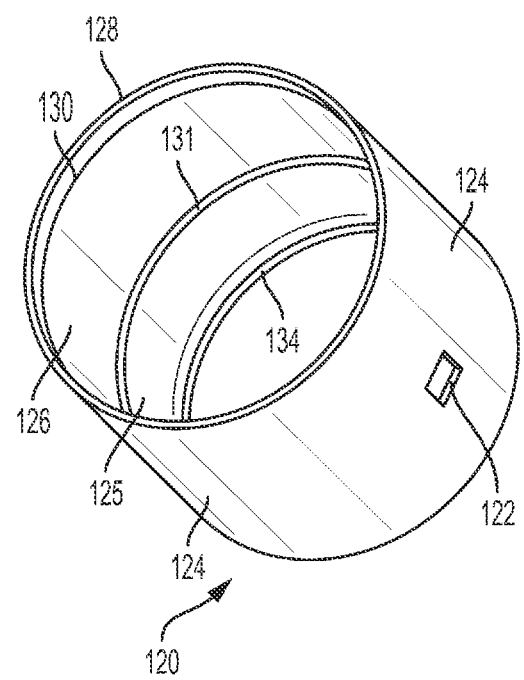
FIG. 6 is a perspective view of an outer cup of the follower mechanism shown in FIGS. 1A and 1B.

Referring additionally to FIG. 6, outer cup 120 of the present embodiment includes a cylindrical outer surface 124, a cylindrical inner surface 125/126 substantially concentric therewith, and aperture 122 defined therein for receiving alignment device 142. As shown, aperture 122 is generally rectangular, but could be oval, square, etc., as well. Outer cup 120 is preferably formed from a sheet metal blank of low, medium or high carbon plain or alloy steel by a stamping process, or deep drawing process using a multi-station transfer or progressive press, in which case aperture 122 is formed by, for example, piercing, machining, or otherwise cutting into outer cup 120. Additionally, outer cup 120 includes an annular lip 128 and 134 formed at each of its opposing ends. Annular lip 128 is thinner in the radial direction than the remaining side wall of outer cup 120, forming an annular ledge 130 therewith. In its initial state, prior to fully assembling follower mechanism 100, annular lip 128 extends axially outwardly parallel to a longitudinal center axis 132 of outer cup 120, whereas annular ledge 130 lies in a plane that is transverse to longitudinal center axis 132. When forming outer cup 120, annular lip 134 may be initially formed depending radially inwardly as the other components of the roller follower are preferably placed into outer cup 120 from the end at which annular lip 128 is disposed. Additionally, a ledge 131, or seat, for receiving pallet 170 is disposed between a first portion 125 and a second portion 126 of the inner surface of outer cup 120. Ledge 131 lies in a plane that is perpendicular to longitudinal center axis 132 of follower mechanism 100.

Figure 3A:
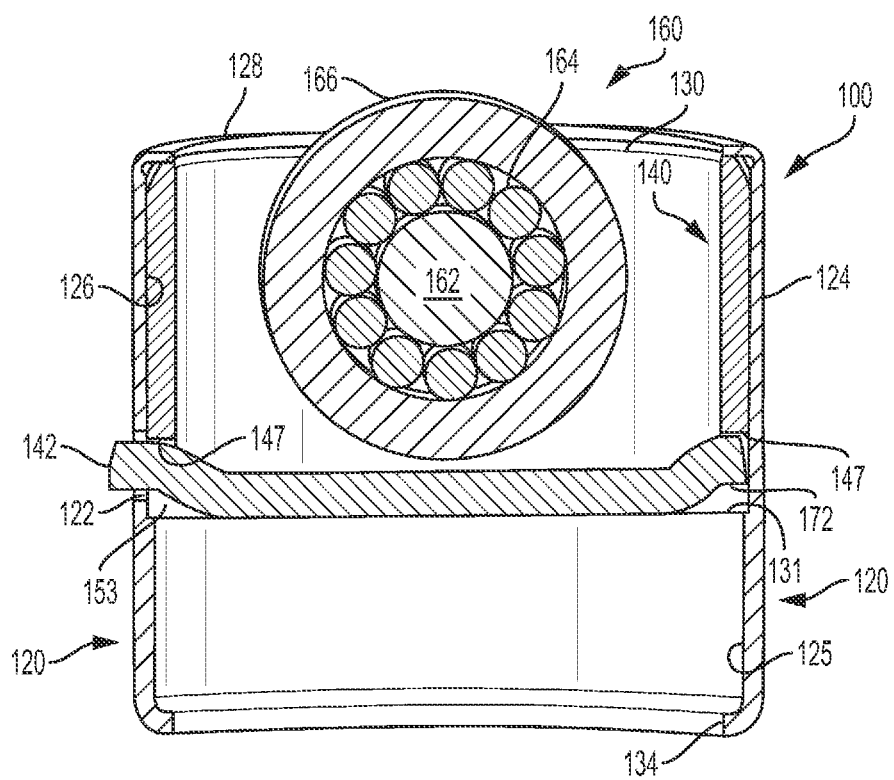
FIGS. 3A and 3B are cross-sectional views of the follower mechanism shown in FIGS. 1A and 1B.
Figure 3B:
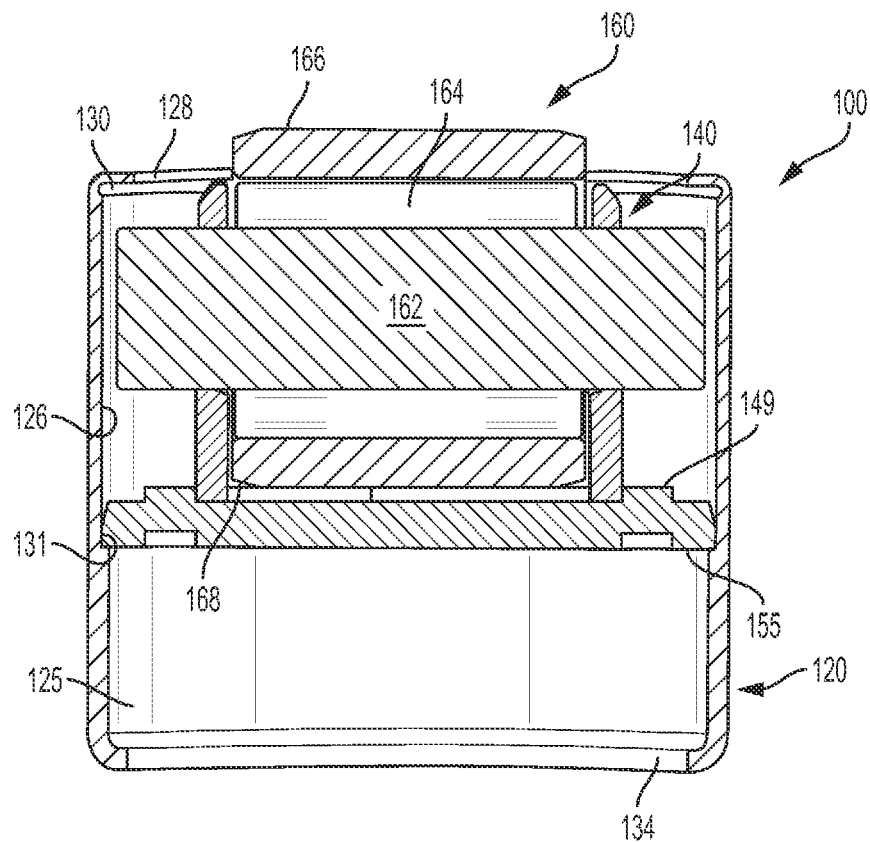
Figure 4A:
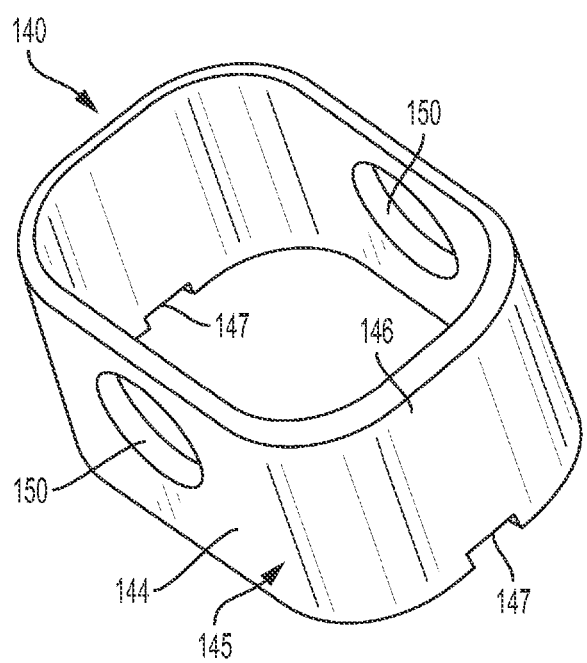
FIGS. 4A and 4B are perspective views of embodiments of inner cups for use in the follower mechanism shown in FIGS. 1A and 1B.

Referring additionally to FIG. 4A, inner cup 140 preferably includes a side wall 145, having two opposed curved potions 146 with two parallel side wall portions 144 extending therebetween, a pair of shaft apertures 150 defined by side walls 144, and a pair of alignment recesses 147 formed in the bottom edge of the side wall. As best seen in FIGS. 1A, 3A and 3B, when fully inserted in outer cup 120, inner cup 140 rests on pallet 170 which in turn rests on annular ledge 131 of outer cup 120 so that alignment device 142 (or tab) extends outwardly from alignment aperture 122. Once fully inserted in outer cup 120 and rotationally positioned by way of alignment tab 142, which is also received in an alignment recess 147 of inner cup 140, as is a second alignment tab 172 on the opposite side of pallet 170, inner cup 140 is retained therein by folding annular lip 128 over inwardly, such as by crimping, spin curling, punch forming, etc., so that inner cup 140 is non-rotatably squeezed between annular lip 128 and pallet 170 which rests on annular ledge 131. Note, since outer cup 120 does not directly support shaft 162 of roller follower 160, it does not require the heat treatment processes that are typically performed on the outer cups of known follower mechanisms. As such, the folding/crimping operation performed on annular lip 128 is facilitated. However, in those applications where heat treatment of outer cup 120 is desired for wear purposes, the heat treatment process occurs after aperture 122 is formed for receiving alignment feature 142. Next, prior to folding, crimping, etc., annular lip 128 over inwardly, annular lip 128 is tempered to facilitate the operation and help prevent cracking.

Figure 4B:
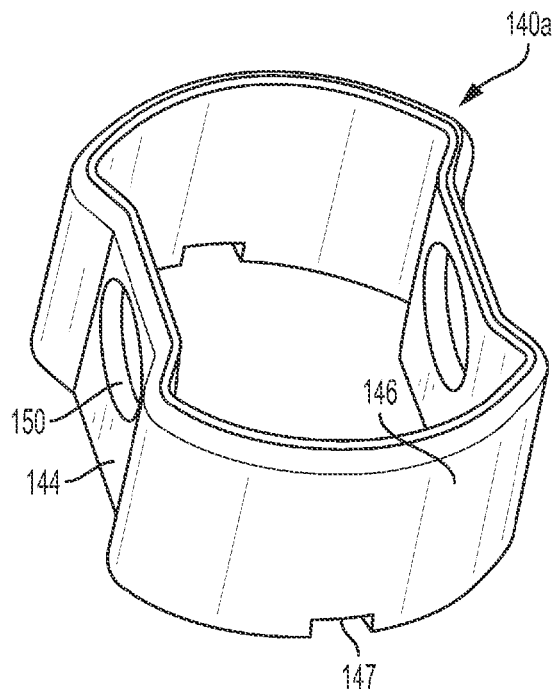

Preferably, inner cup 140 is formed from a sheet metal blank by a stamping process, or drawing process, and is subjected to heat treatment processes as it directly supports shaft 162 of follower mechanism 100 and supports the cyclical force exerted by pump stem 190 (FIG. 7) on the bottom of pallet 170. Prior to the heat treatment processes, shaft apertures 150 are pierced in side wall portions 144 of inner cup 140. FIG. 4A shows a DD configuration for inner cup 140. Note, other configurations for inner cup are possible, such as the MM configuration of inner cup 140a shown in FIG. 4B.

Figure 5:
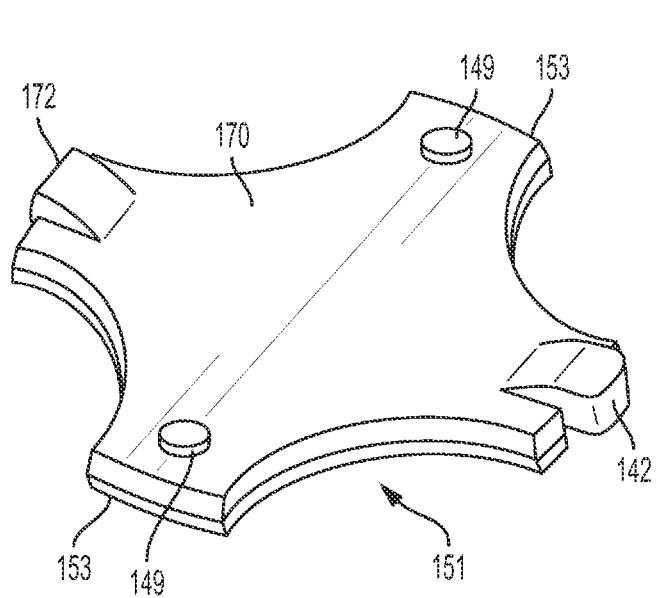
FIG. 5 is a perspective view of pallet of the follower mechanism shown in FIGS. 1A and 1B.

Referring additionally to FIG. 5, pallet 170 includes a number of scalloped recesses 151 that allow lubrication flow through inner cup 140 when assembled. Between each pair of recesses 151, an abutment end 153 is formed that is received on annular ledge 131 of outer cup 120, as best seen in FIGS. 3A and 3B. Two of the opposed abutment ends 153 include alignment device 142 and alignment tab 172 disposed thereon, where the remaining two abutment ends 153 each include an alignment post 149 depending upwardly therefrom. When inner cup 140 is seated on pallet 170, alignment device 142 and alignment tab 172 are each received in a corresponding alignment recess 147 on the bottom edge of inner cup 140, and each alignment post 149 abuts an outer surface of a corresponding side wall portion 144 of inner cup 140 to insure proper alignment between the two components. Additionally, alignment device 142 includes a rounded distal end that is correspondingly shaped to the alignment groove (not shown) that is formed in the corresponding cylinder head 188 (FIG. 7). Pallet 170 is perpendicular to longitudinal center axis 132 of follower mechanism 100 and facilitates the transfer of forces from follower mechanism 100 to the corresponding pump stem 190, or in the alternative, valve stem.

Figure 2:
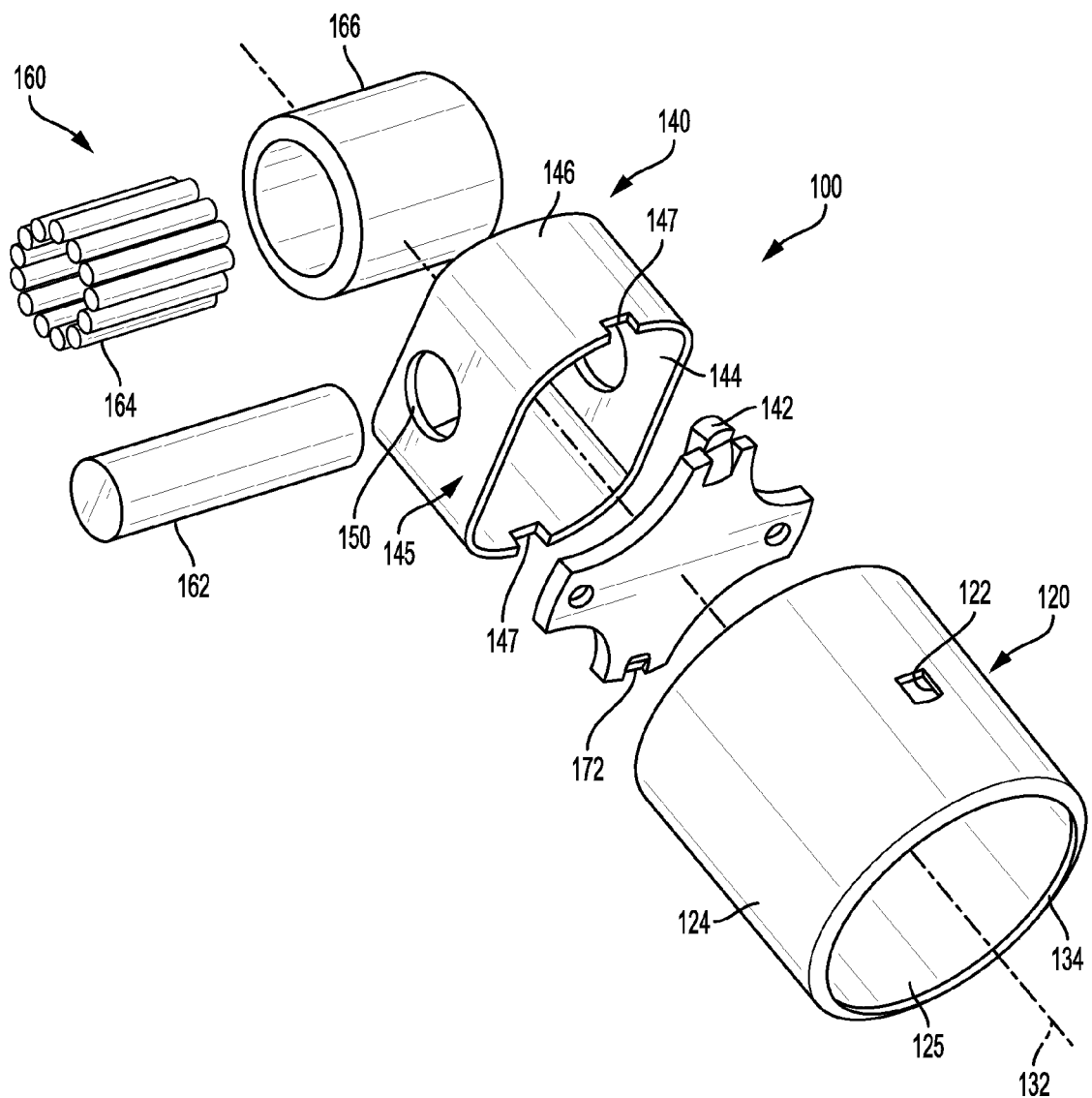
FIG. 2 is an exploded perspective view of the follower mechanism shown in FIGS. 1A and 1B.

As best seen in FIG. 2, roller follower 160 includes shaft 162, an outer race 166, and a plurality of rollers 164 disposed therebetween such that race 166 is freely rotatable about shaft 162. Opposite ends of shaft 162 are received in shaft apertures 150 of inner cup 140 such that roller follower 160 is mounted to outer cup 120 of follower mechanism 100 by way of the inner cup and pallet 170. When assembled, roller follower 160 extends axially outwardly beyond the top edge of outer cup 120 such that outer surface of race 166 engages a corresponding lobe 184 of camshaft 182, as shown in FIG. 7. Preferably, the diameters of shaft apertures 150 are slightly larger than the diameter of shaft 162 such that shaft 162 is free to rotate within shaft apertures 150 during operation. Alternately, the opposing ends of shaft 162 can be staked, swaged, etc., to inner cup 140 such that rotation relative thereto is prevented. Note, when shaft 162 is free to rotate within shaft apertures 150, the axial motion of shaft 162 is limited by abutment at either end with the first portion of inner surface 126 of outer cup 120 as best seen in FIG. 3B. Preferably, the flat inner surfaces of side wall portion 144 of inner cup 140 act as bearing surfaces for the ends of rollers 164, although a pair of washers (not shown) may also be used if desired.

Figure 8A:
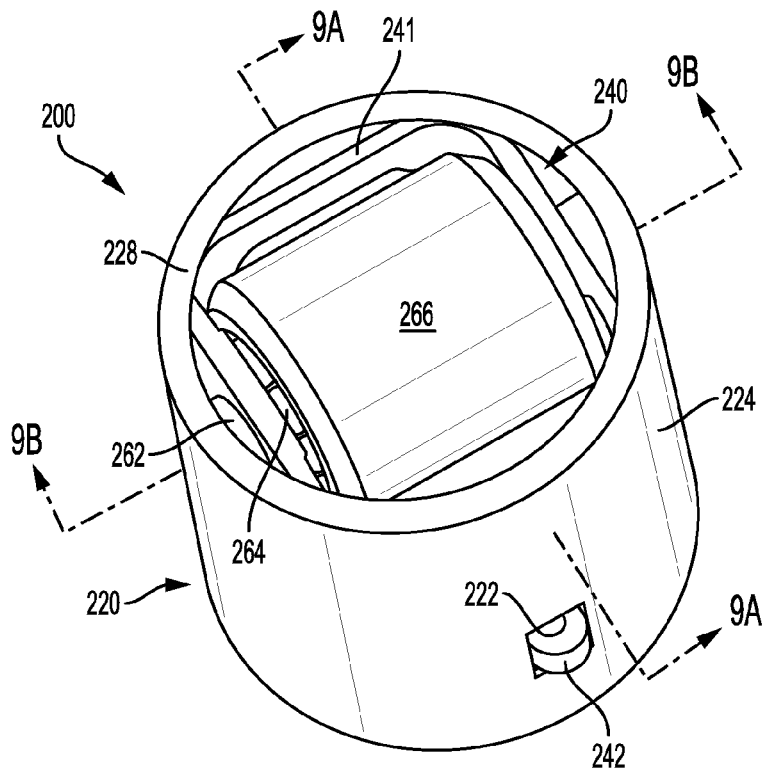
FIGS. 8A and 8B are perspective views of another alternate embodiment of a follower mechanism in accordance with the present disclosure.
Figure 8B:
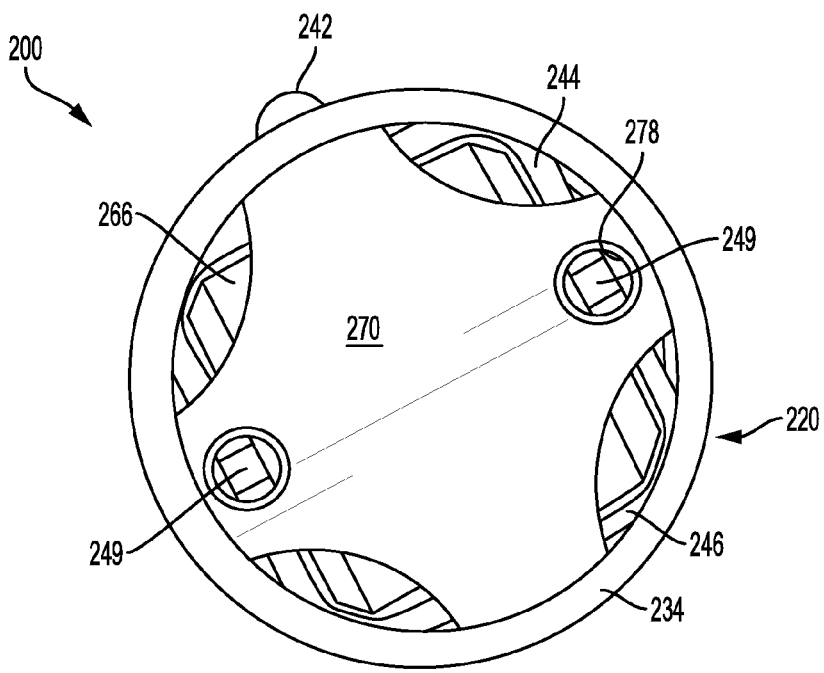

As shown in FIGS. 8A through 8B, an alternate embodiment of a follower mechanism 200 in accordance with the present disclosure includes a substantially cylindrical outer cup 220, an inner cup 240 received therein on a pallet 270, a roller follower 260 supported by inner cup 240, and an alignment device 242 extending through an aperture 222 formed in outer cup 220. Similarly to the previously described embodiment, follower mechanism 200 may be used in a high-pressure fuel pump 180 (FIG. 7) of an internal combustion engine, although other uses for follower mechanism 200 are possible.

Figure 13:
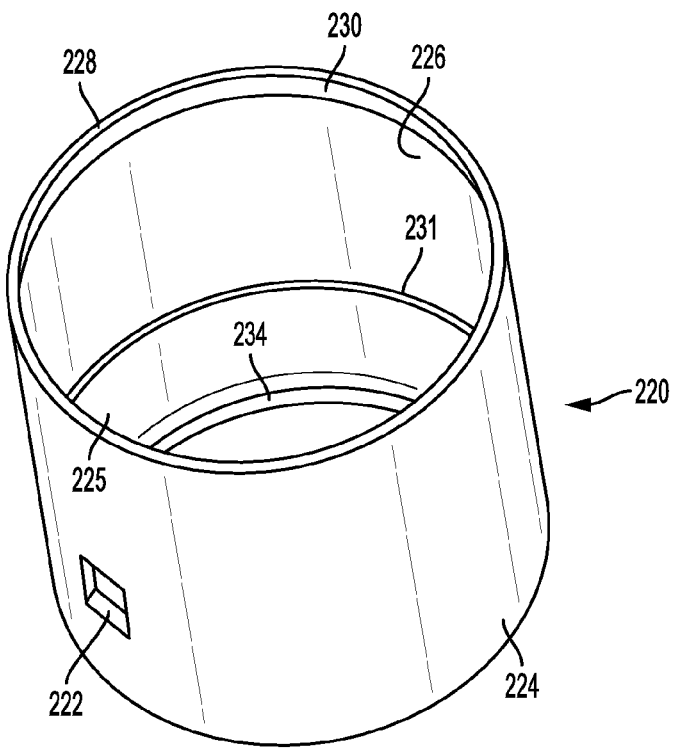
FIG. 13 is a perspective view of an outer cup of the follower mechanism shown in FIGS. 8A and 8B.

Referring additionally to FIG. 13, outer cup 220 of the present embodiment includes a cylindrical outer surface 224, a cylindrical inner surface 225/226 substantially concentric therewith, and aperture 222 defined therein for receiving alignment device 242. As shown, aperture 222 is generally rectangular, but could be oval, square, etc., as well. Outer cup 220 is preferably formed from a sheet metal blank of low, medium or high carbon plain or alloy steel by a stamping process, or deep drawing process using a multi-station transfer or progressive press, in which case aperture 222 is formed by, for example, piercing, machining, or otherwise cutting into outer cup 220. Additionally, outer cup 220 includes an annular lip 228 and 234 formed at each of its opposing ends. Annular lip 228 is thinner in the radial direction than the remaining side wall of outer cup 220, forming an annular ledge 230 therewith. In its initial state, prior to fully assembling follower mechanism 200, annular lip 228 extends axially outwardly parallel to a longitudinal center axis 232 of outer cup 220, whereas annular ledge 230 lies in a plane that is transverse to longitudinal center axis 232. When forming outer cup 220, annular lip 234 may be initially formed depending radially inwardly as the other components of the roller follower are preferably placed into outer cup 220 from the end at which annular lip 228 is disposed. Additionally, a ledge 231, or seat, for receiving pallet 270 is disposed between a first portion 225 and a second portion 226 of the inner surface of outer cup 220. Ledge 231 lies in a plane that is perpendicular to longitudinal center axis 232 of follower mechanism 200.

Figure 10A:
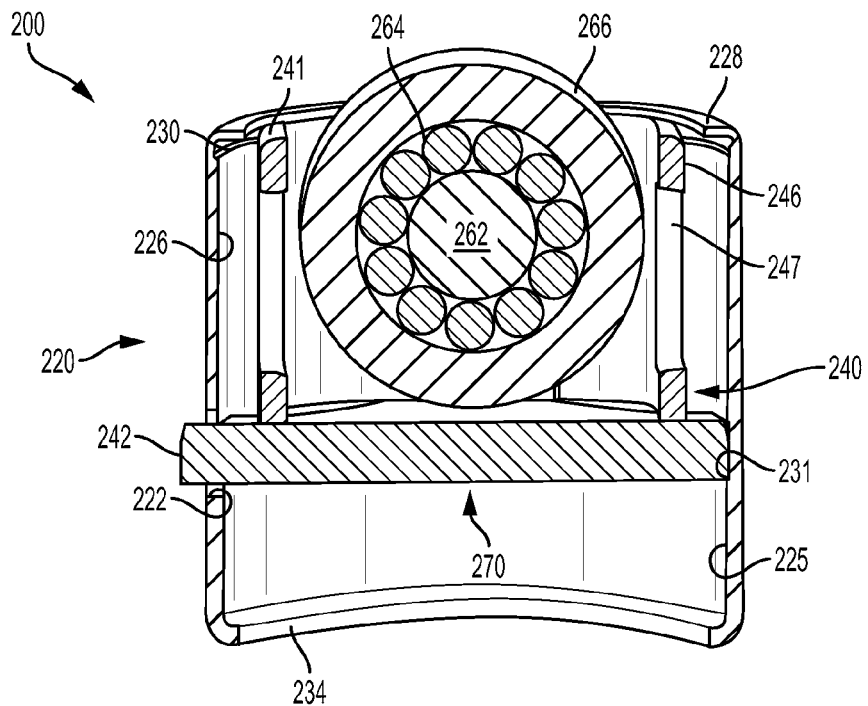
FIGS. 10A, 10B and 10C are cross-sectional views of the follower mechanism shown in FIGS. 8A and 8B.
Figure 10B:
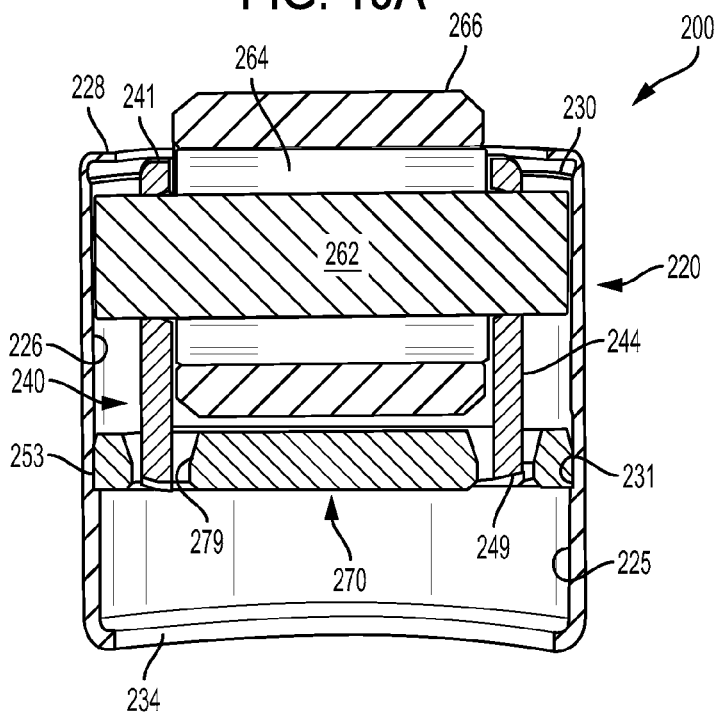
Figure 10C:
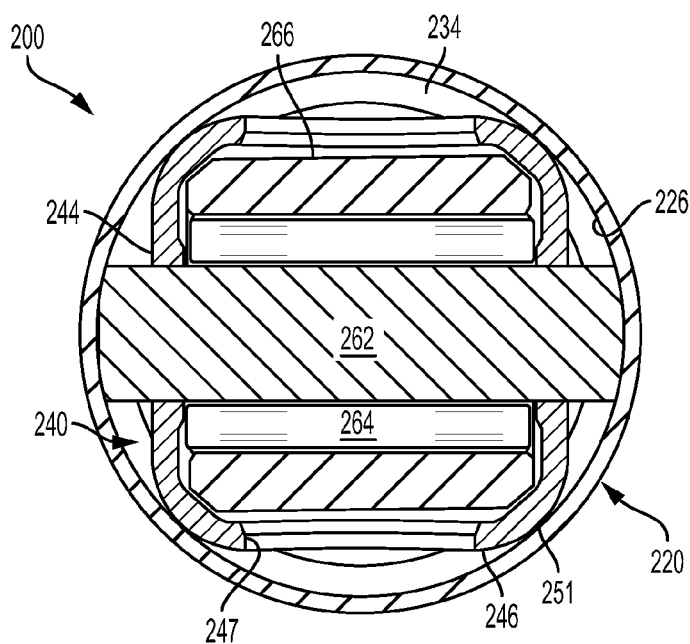
Figure 11:
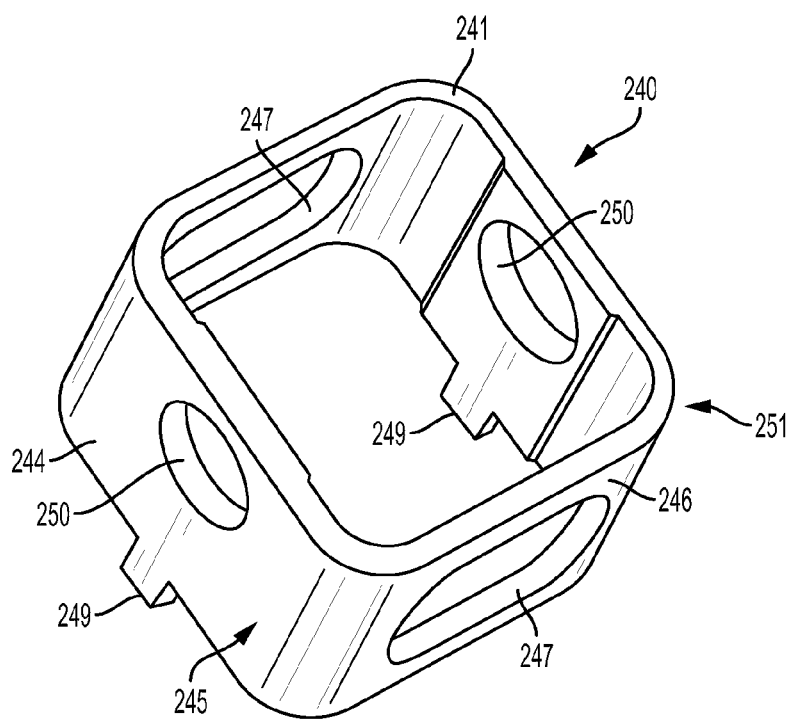
FIG. 11 is a perspective view of an inner cup of the follower mechanism shown in FIGS. 8A and 8B.

Referring additionally to FIG. 11, inner cup 240 preferably includes a side wall 245, having first and second pairs of parallel side walls 244 and 246, respectively, a pair of shaft apertures 250 defined by first side walls 244, a pair of apertures 242 formed in second side walls 246, and a pair of alignment posts 249 extending axially downwardly from the bottom edge of the side wall. As best seen in FIGS. 10A and 10B, when fully inserted in outer cup 220, inner cup 240 rests on pallet 270 which in turn rests on annular ledge 231 of outer cup 220 so that alignment device 242 (or tab) extends outwardly from alignment aperture 222. Once fully inserted and rotationally positioned by way of alignment tab 242 and the positioning of alignment posts 249 in corresponding apertures 279 defined by pallet 270, inner cup 240 is retained therein by folding annular lip 228 over inwardly, such as by crimping, spin curling, punch forming, etc., so that inner cup 240 is non-rotatably squeezed between annular lip 228 and pallet 270 which rests on annular ledge 231. As best seen in FIG. 8A, the inner cup's pairs of first and second side walls 244 and 246 are perpendicular to each other, meeting at rounded corners 251. When fully assembled, annular lip 228 abuts inner cup 340 on the upper surfaces 241 at these corners 251.

Note, since outer cup 220 does not directly support shaft 262 of roller follower 260, it does not require the heat treatment processes that are typically performed on the outer cups of known follower mechanisms. As such, the folding/crimping operation performed on annular lip 228 is facilitated. However, in those applications where heat treatment of outer cup 220 is desired for wear purposes, the heat treatment process occurs after aperture 222 is formed for receiving alignment device 242. Next, prior to folding, crimping, etc., annular lip 228 over inwardly, annular lip 228 is tempered to facilitate the operation and help prevent cracking.

Preferably, inner cup 240 is formed from a sheet metal blank by a stamping process, or drawing process, and is subjected to heat treatment processes as it directly supports shaft 262 of follower mechanism 200 and supports the cyclical force exerted by pump stem 190 (FIG. 7) on the bottom of pallet 270. Prior to the heat treatment processes, shaft apertures 250 are pierced in first side walls 244 of inner cup 240 as are apertures 247 in second side walls 246. Apertures 247 are provided to reduce the overall weight of follower mechanism 200.

Figure 12:
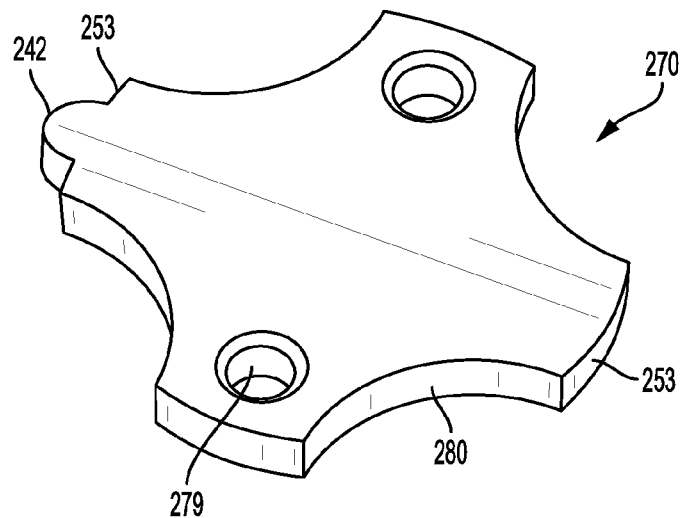
FIG. 12 is a perspective view of pallet of the follower mechanism shown in FIGS. 8A and 8B.

Referring additionally to FIG. 12, pallet 270 includes a number of scalloped recesses 280 that allow lubrication flow through inner cup 240 when assembled. Between each pair of recesses 280, an abutment end 253 is formed that is received on annular ledge 231 of outer cup 220, as best seen in FIGS. 10A and 10B. One of the abutment ends 253 includes alignment device 242 disposed thereon, whereas two opposed abutment ends 253 each include an aperture 279 defined therein for receiving a corresponding alignment post 249 of inner cup 240. When inner cup 240 is seated on pallet 270, alignment device 242 extends outwardly through alignment aperture 222 of outer cup 220 and each alignment post 249 of inner cup 240 extends downwardly into a corresponding aperture 279 of pallet 270 to insure proper alignment between the two components. Alignment device 242 includes a rounded distal end that is correspondingly shaped to the alignment groove (not shown) that is formed in the corresponding cylinder head 188 (FIG. 7). Pallet 270 is perpendicular to longitudinal center axis 232 of follower mechanism 200 and facilitates the transfer of forces from follower mechanism 200 to the corresponding pump stem 190, or in the alternative, valve stem.

Figure 9:
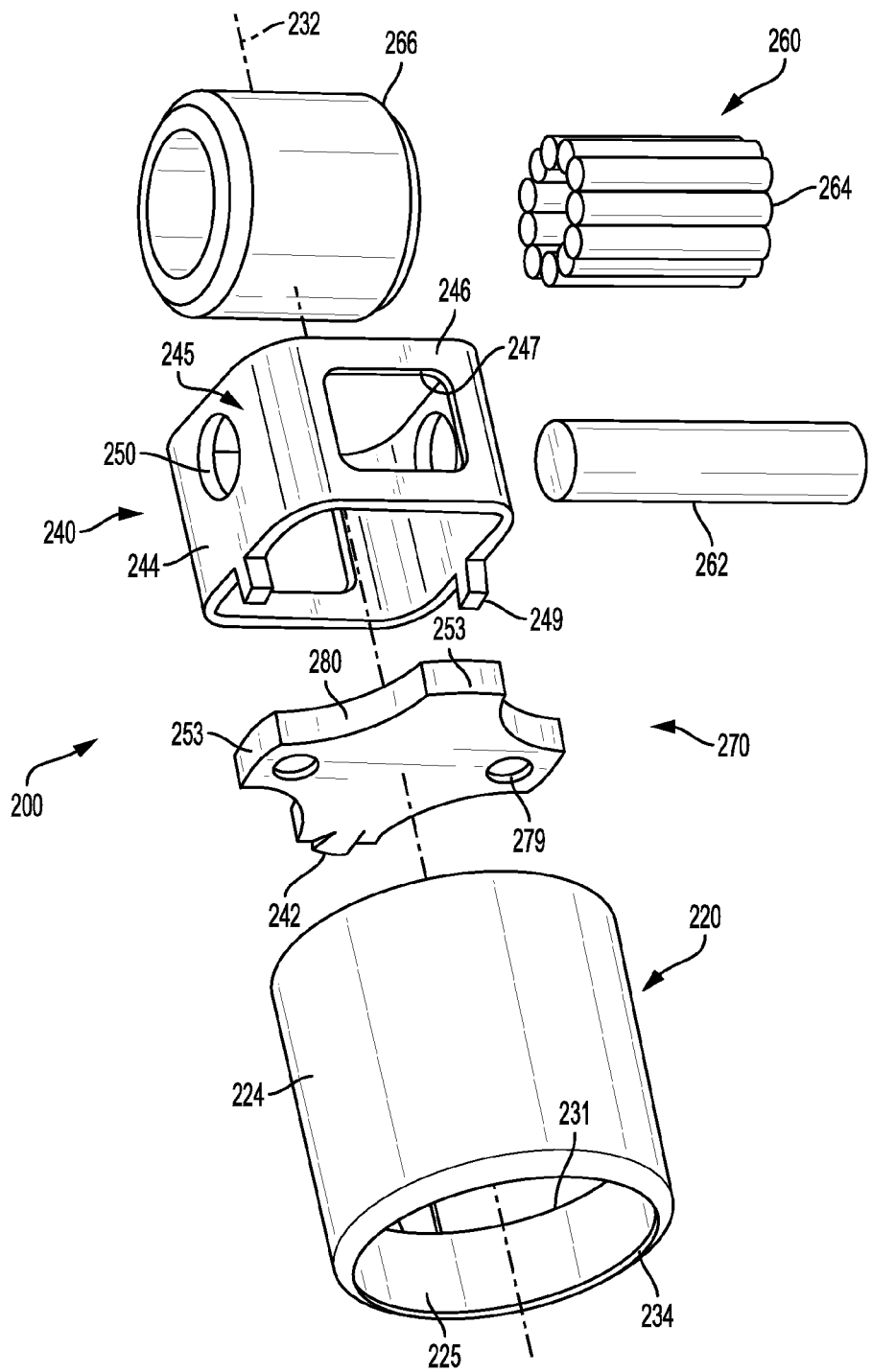
FIG. 9 is an exploded perspective view of the follower mechanism shown in FIGS. 8A and 8B.

As best seen in FIG. 9, roller follower 260 includes shaft 262, an outer race 266, and a plurality of rollers 264 disposed therebetween such that race 266 is freely rotatable about shaft 262. Opposite ends of shaft 262 are received in shaft apertures 250 of inner cup 240 such that roller follower 260 is mounted to outer cup 220 of follower mechanism 200 by way of the inner cup and pallet 270. When assembled, roller follower 260 extends axially outwardly beyond the top edge of outer cup 220 such that outer surface of race 266 engages a corresponding lobe 284 of camshaft 282, as shown in FIG. 7. Preferably, the diameters of shaft apertures 250 are slightly larger than the diameter of shaft 262 such that shaft 262 is free to rotate within shaft apertures 250 during operation. Alternately, the opposing ends of shaft 262 can be staked, swaged, etc., to inner cup 240 such that rotation relative thereto is prevented. Note, when shaft 262 is free to rotate within shaft apertures 250, the axial motion of shaft 262 is limited by abutment at either end with the first portion of inner surface 226 of outer cup 220 as best seen in FIG. 10B. Preferably, the flat inner surfaces of first side walls 244 of inner cup 240 act as bearing surfaces for the ends of rollers 264, although a pair of washers (not shown) may also be used if desired.

As shown in FIGS. 14A through 16, an alternate embodiment of a follower mechanism 300 in accordance with the present disclosure includes a substantially cylindrical outer cup 320, an inner cup 340 received therein on a pallet 370, a roller follower 360 supported by inner cup 340, and an alignment device 342 extending through an aperture 322 formed in outer cup 320. Similarly to the previously described embodiments, follower mechanism 300 may used in a high-pressure fuel pump 180 (FIG. 7) of an internal combustion engine, although other uses for follower mechanism 300 are possible.

Outer cup 320 of the present embodiment includes a cylindrical outer surface 324, a cylindrical inner surface 326 substantially concentric therewith, and aperture 322 defined therein for receiving alignment device 342. As shown, aperture 322 is generally rectangular, but could be oval, square, etc., as well. Outer cup 320 is preferably formed from a sheet metal blank of low, medium or high carbon plain or alloy steel by a stamping process, or deep drawing process using a multi-station transfer or progressive press, in which case aperture 322 is formed by, for example, piercing, machining, or otherwise cutting into outer cup 320. Additionally, outer cup 320 includes an annular lip 328 and 334 formed at each of its opposing ends. Annular lip 328 is thinner in the radial direction than the remaining side wall of outer cup 320, forming an annular ledge 330 therewith. In its initial state, prior to fully assembling follower mechanism 300, annular lip 328 extends axially outwardly parallel to a longitudinal center axis 332 of outer cup 320, whereas annular ledge 230 lies in a plane that is transverse to longitudinal center axis 332. When forming outer cup 320, annular lip 334 may be initially formed depending radially inwardly as the other components of the roller follower are preferably placed into outer cup 320 from the end at which annular lip 328 is disposed. Unlike the previously described embodiments, outer cup 320 does not include a ledge formed on its inner surface 326 that is configured to support inner cup 340. Rather, follower mechanism 300 includes a spacer element 390 that supports both pallet 370 and inner cup 340 within outer cup 320, as described.

Figure 15A:
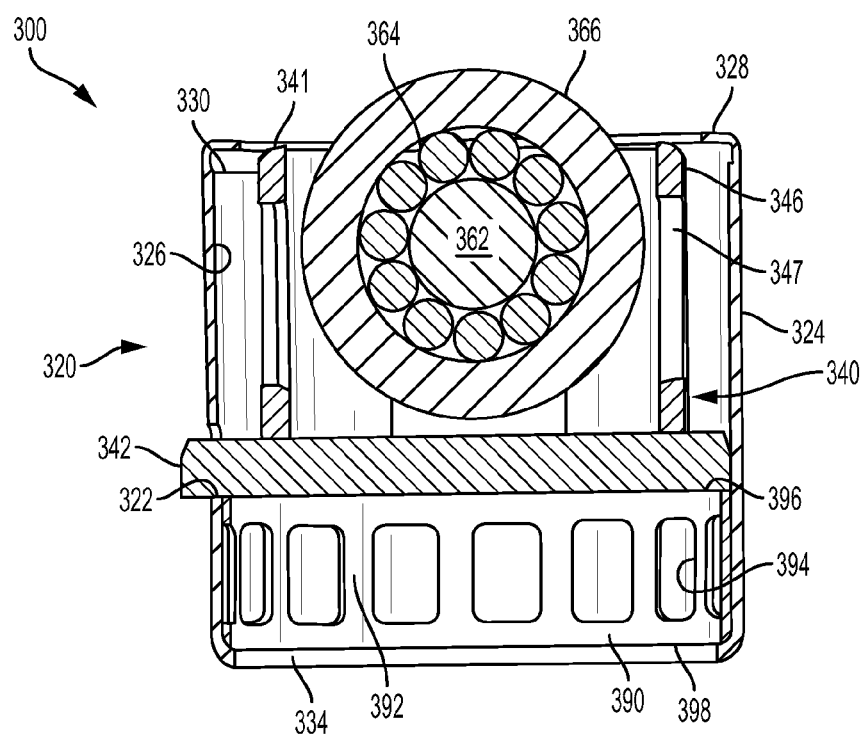
FIGS. 15A and 15B are cross-sectional views of the follower mechanism shown in FIG. 14.
Figure 15B:
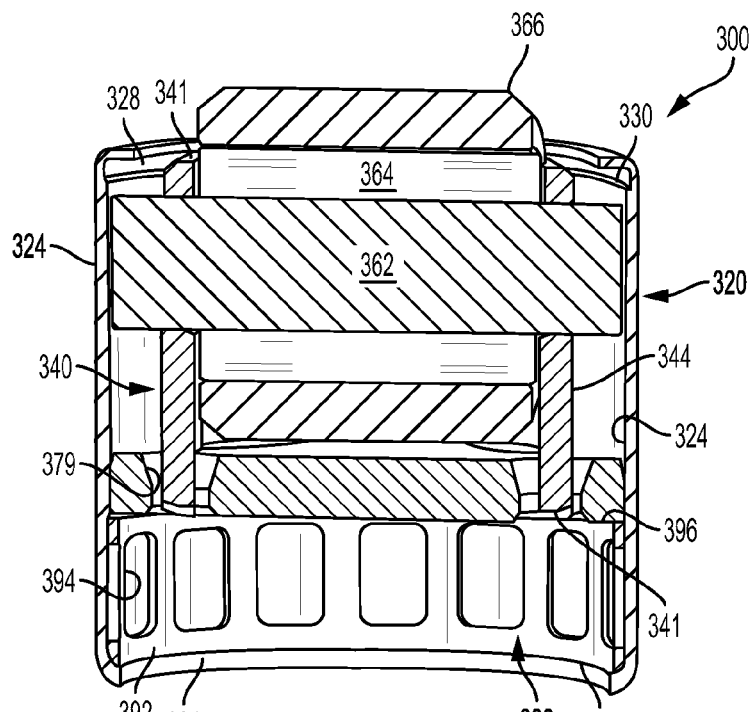
Figure 16:
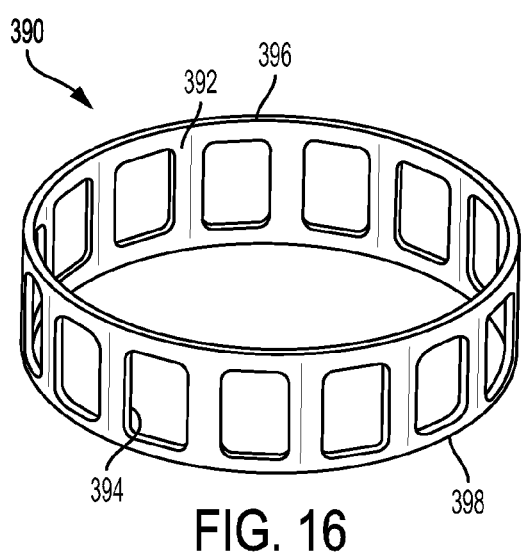
FIG. 16 is a perspective view of a spacer element of the follower mechanism.
Figure 17A:
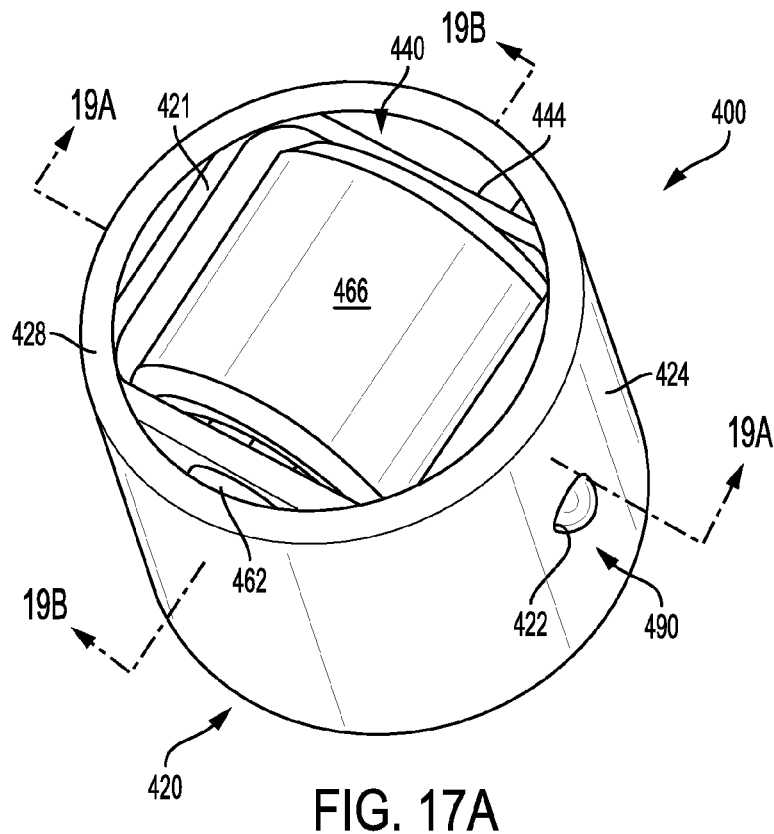
FIGS. 17A and 17B are perspective views of another alternate embodiment of a follower mechanism in accordance with the present disclosure.
Figure 17B:
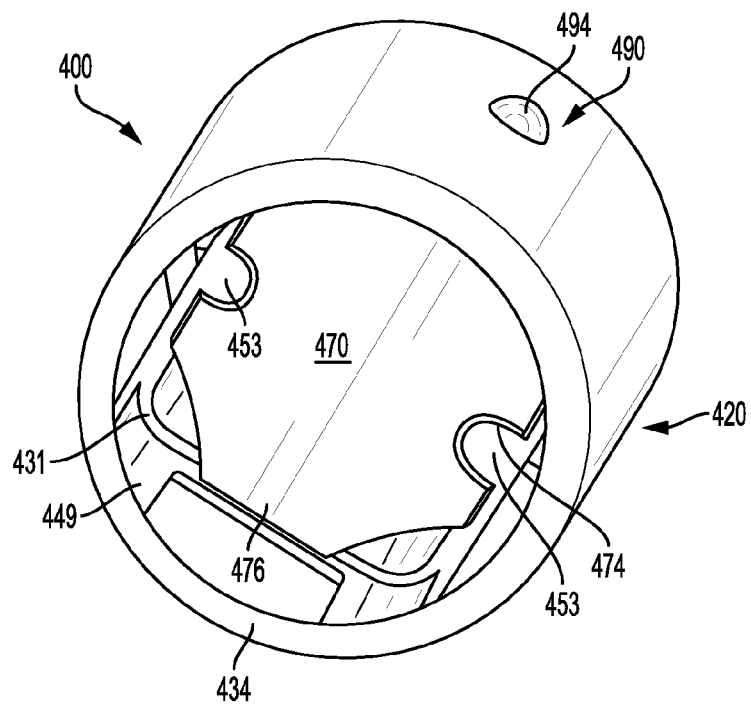
Figure 18:
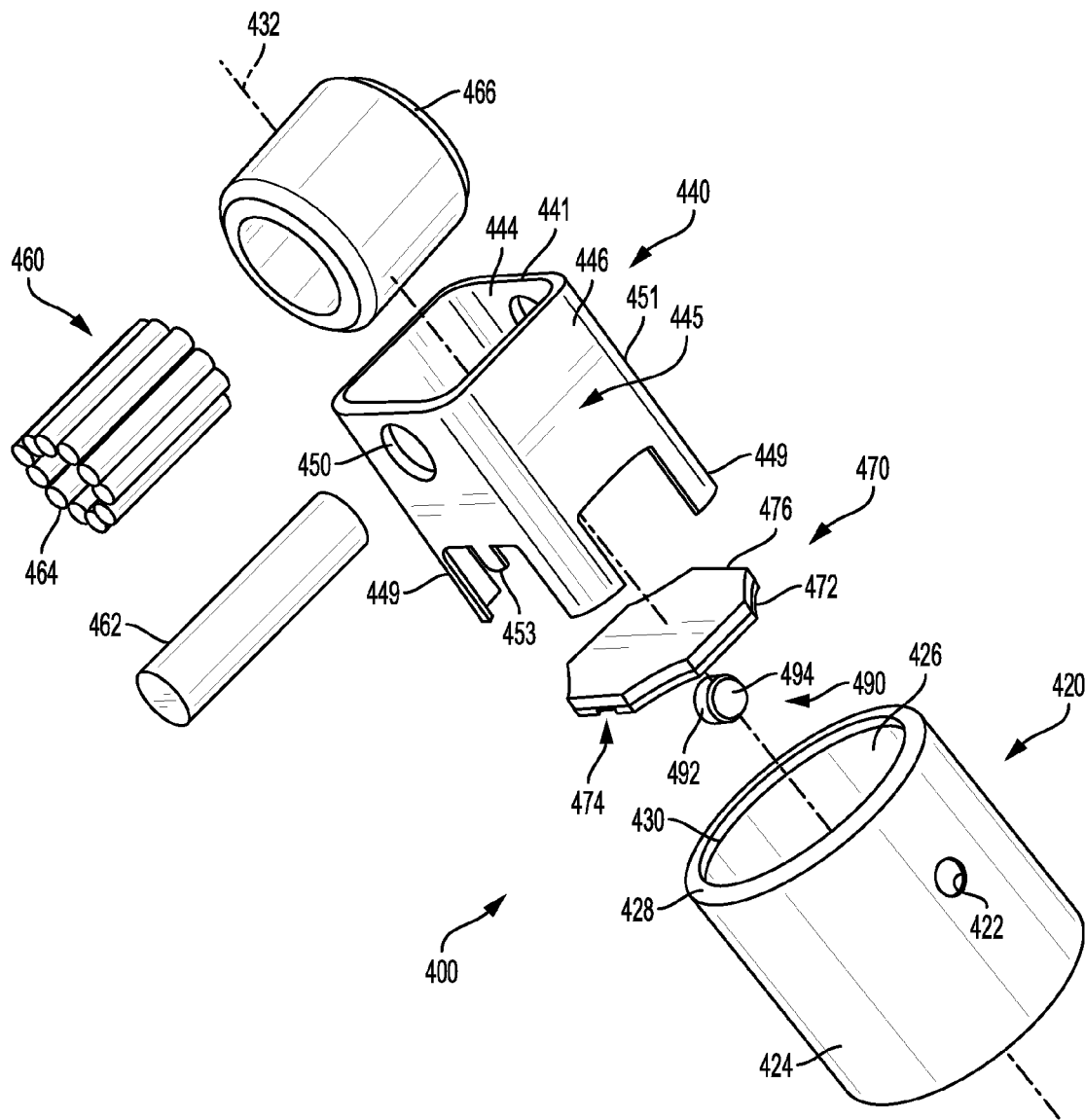
FIG. 18 is an exploded perspective view of the follower mechanism shown in FIGS. 17A and 17B.

Referring additionally to FIG. 16, spacer element 390 preferably includes a cylindrical side wall 392 including a plurality of apertures 394 formed therein. As best seen in FIGS. 15A and 15B, when fully inserted in outer cup 320, a bottom edge 398 of side wall 392 abuts annular lip 334 so that an upper edge 396 of side wall 392 is positioned to support pallet 370 and, therefore, inner cup 340 in outer cup 320. Preferably, spacer element 390 is formed from a sheet metal blank of low, medium or high carbon plain or alloy steel by a stamping process, or deep drawing process using a multi-station transfer or progressive press, and is not subjected to heat treatment processes as it does not directly support shaft 362 of follower mechanism 300. Apertures 394 are pierced in side wall 392 of spacer element 390 as a means of reducing the overall weight of follower mechanism 300. Note, since spacer element 390 does not directly support shaft 362, it may be formed of materials other than metal, such as a plastic, composite material, etc.

Figure 14:
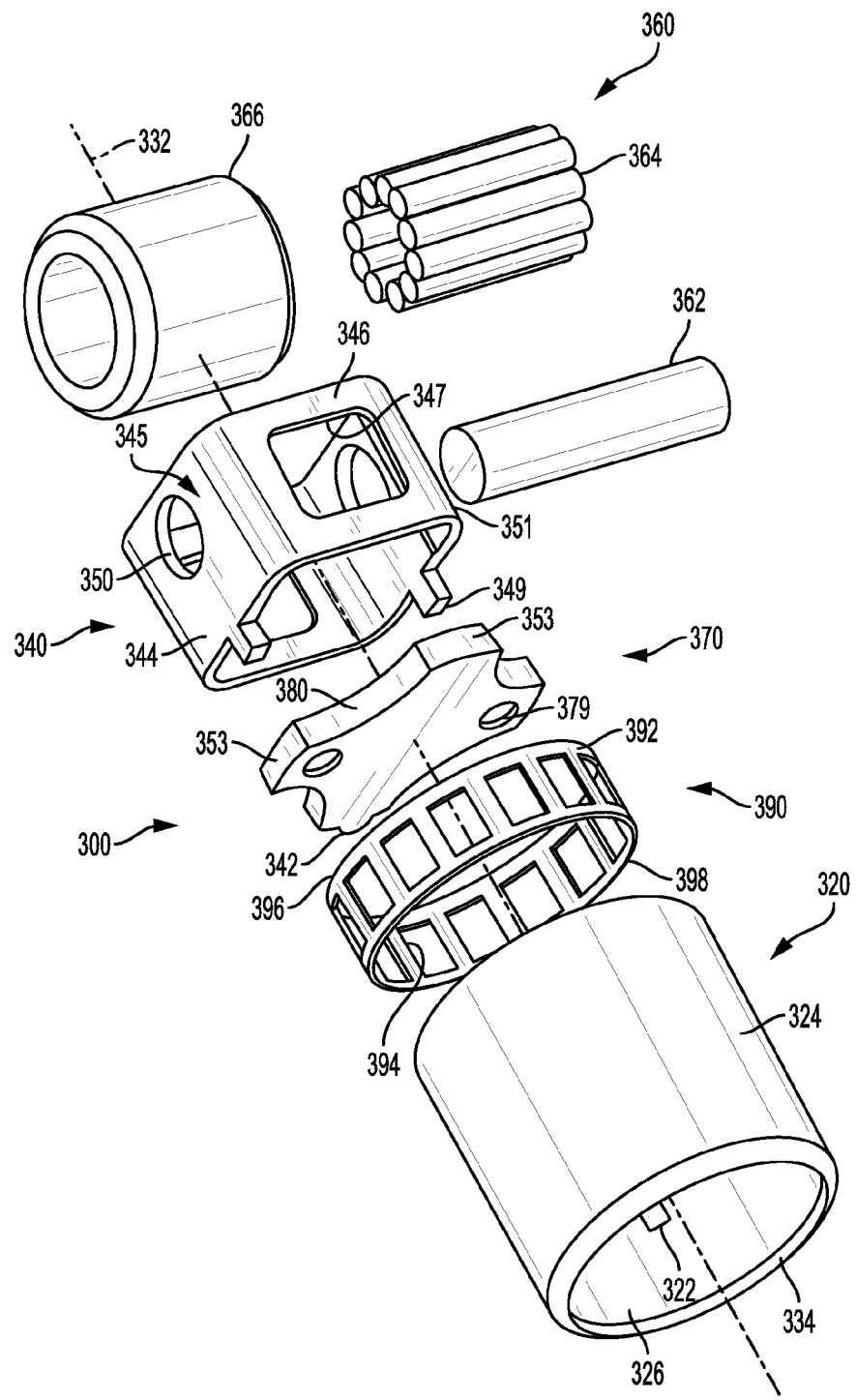
FIG. 14 is an exploded perspective view of an alternate embodiment of a follower mechanism in accordance with the present disclosure.

Inner cup 340 preferably includes a side wall 345, having two first and second pairs of parallel side walls 344 and 346, respectively, a pair of shaft apertures 350 defined by first side walls 344, a pair of apertures 342 formed in second side walls 346, and a pair of alignment posts 349 extending axially downwardly from the bottom edge of the side wall. As best seen in FIGS. 15A and 15B, when fully inserted in outer cup 320, inner cup 340 rests on pallet 370 which in turn rests on upper edge 396 of spacer element 390 so that alignment device 342 (or tab) extends outwardly from alignment aperture 322. Once fully inserted and rotationally positioned by way of alignment tab 342 and the positioning of alignment posts 349 in corresponding apertures 379 defined by pallet 370, inner cup 340 is retained therein by folding annular lip 328 over inwardly, such as by crimping, spin curling, punch forming, etc., so that inner cup 340 is non-rotatably squeezed between annular lip 328 and pallet 370 which rests on spacer element 390. As best seen in FIG. 14, the inner cup's pairs of first and second side walls 344 and 346 are perpendicular to each other, meeting at rounded corners 351. When fully assembled, annular lip 328 abuts inner cup 340 on upper surface 341 of these corners 351.

Note, since outer cup 320 does not directly support shaft 362 of roller follower 360, it does not require the heat treatment processes that are typically performed on the outer cups of known follower mechanisms. As such, the folding/crimping operation performed on annular lip 328 is facilitated. However, in those applications where heat treatment of outer cup 320 is desired for wear purposes, the heat treatment process occurs after aperture 322 is formed for receiving alignment feature 342. Next, prior to folding, crimping, etc., annular lip 328 over inwardly, annular lip 328 is tempered to facilitate the operation and help prevent cracking.

Preferably, inner cup 340 is formed from a sheet metal blank by a stamping process, or drawing process, and is subjected to heat treatment processes as it directly supports shaft 362 of follower mechanism 300 and supports the cyclical force exerted by pump stem 190 (FIG. 7) on the bottom of pallet 370. Prior to the heat treatment processes, shaft apertures 350 are pierced in first side walls 344 of inner cup 340 as are apertures 347 in second side walls 346. Apertures 347 are provided to reduce the overall weight of follower mechanism 300.

Referring to FIG. 14, pallet 370 includes a number of scalloped recesses 380 that allow lubrication flow through inner cup 340 when assembled. Between each pair of recesses 380, an abutment end 353 is formed that is received on upper edge 396 of spacer element 390, as best seen in FIGS. 15A and 15B. One of the abutment ends 353 includes alignment device 342 disposed thereon, whereas two opposed abutment ends 353 each includes an aperture 379 defined therein for receiving a corresponding alignment post 349 of inner cup 340. When inner cup 340 is seated on pallet 370, alignment device 342 extends outwardly through alignment aperture 322 of outer cup 320 and each alignment post 349 of inner cup 340 extends downwardly into a corresponding aperture 379 of pallet 370 to insure proper alignment between the two components. Alignment device 342 includes a rounded distal end that is correspondingly shaped to the alignment groove (not shown) that is formed in the corresponding cylinder head 188 (FIG. 7). Pallet 370 is perpendicular to longitudinal center axis 332 of follower mechanism 300 and facilitates the transfer of forces from follower mechanism 300 to the corresponding pump stem 190, or in the alternative, valve stem.

As shown, roller follower 360 includes shaft 362, an outer race 366, and a plurality of rollers 364 disposed therebetween such that race 366 is freely rotatable about shaft 362. Opposite ends of shaft 362 are received in shaft apertures 350 of inner cup 340 such that roller follower 360 is mounted to outer cup 320 of follower mechanism 300 by way of the inner cup and pallet 370 and spacer element 390. Preferably, the diameters of shaft apertures 350 are slightly larger than the diameter of shaft 362 such that shaft 362 is free to rotate within shaft apertures 350 during operation, although the opposing ends of shaft 362 can be staked, swaged, etc., to inner cup 340. Preferably, the flat inner surfaces of first side walls 344 of inner cup 340 act as bearing surfaces for the ends of rollers 364, although a pair of washers (not shown) may also be used if desired.

Referring now to FIGS. 17A through 19C, an alternate embodiment of a follower mechanism 400 in accordance with the present disclosure includes a substantially cylindrical outer cup 420, an inner cup 440 received therein, a pallet 470, a roller follower 460 supported by inner cup 440, and an alignment device 490 extending through an aperture 422 formed in outer cup 420. Similarly to the previously described embodiments, follower mechanism 400 may used in a high-pressure fuel pump 180 (FIG. 7) of an internal combustion engine, although other uses for follower mechanism 400 are possible.

Outer cup 420 of the present embodiment includes a cylindrical outer surface 424, a cylindrical inner surface 426 substantially concentric therewith, and aperture 422 defined therein for receiving alignment device 490. As shown, aperture 422 is generally circular, but could be oval, square, etc., depending on the cross-sectional shape of the alignment device. Outer cup 420 is preferably formed from a sheet metal blank of low, medium or high carbon plain or alloy steel by a stamping process, or deep drawing process using a multi-station transfer or progressive press, in which case aperture 422 is formed by, for example, piercing, machining, or otherwise cutting into outer cup 420. Additionally, outer cup 420 includes annular lips 428 and 434 formed at each of its opposing ends. Annular lip 428 is thinner in the radial direction than the remaining side wall of outer cup 420, forming an annular ledge 430 therewith. In its initial state, prior to fully assembling follower mechanism 400, annular lip 428 extends axially outwardly parallel to a longitudinal center axis 432 of outer cup 420, whereas annular ledge 430 lies in a plane that is transverse to longitudinal center axis 432. When forming outer cup 420, annular lip 434 may be initially formed depending radially inwardly as the other components of the roller follower are preferably placed into outer cup 420 from the end at which annular lip 428 is disposed. Unlike some of the previously described embodiments, outer cup 420 does not include a ledge formed on its inner surface 426 between its top and bottom ends that is configured to support inner cup 440 thereon. Rather, inner cup 340 includes a plurality of legs 449 that are directly supported on annular lip 434, as discussed in greater detail below.

Figure 19A:
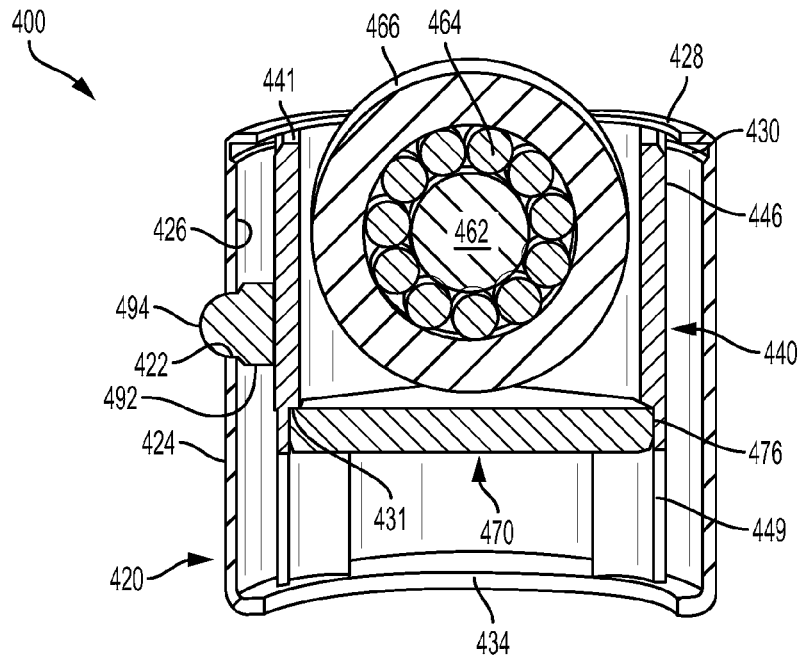
FIGS. 19A, 19B, 19C and 19D are cross-sectional views of the follower mechanism shown in FIGS. 17A and 17B.
Figure 19B:
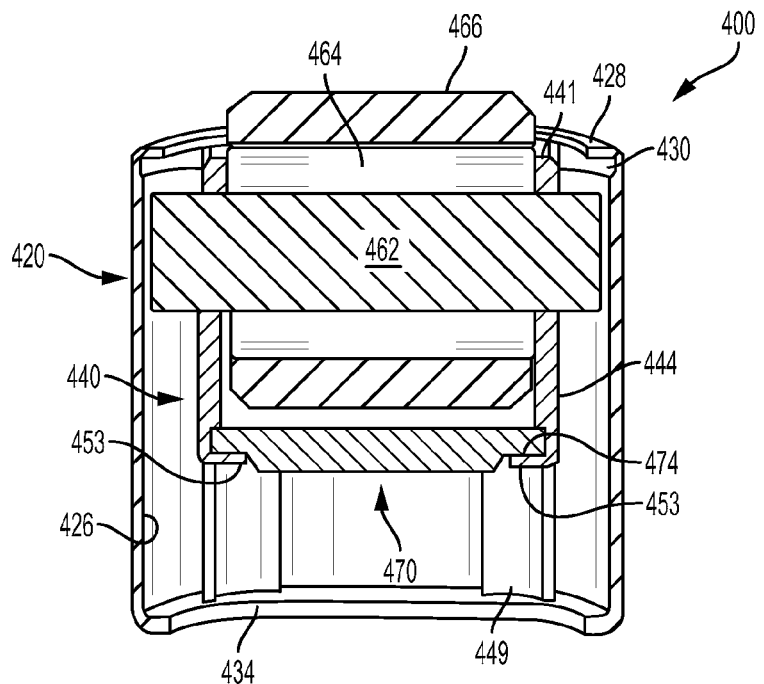
Figure 19C:
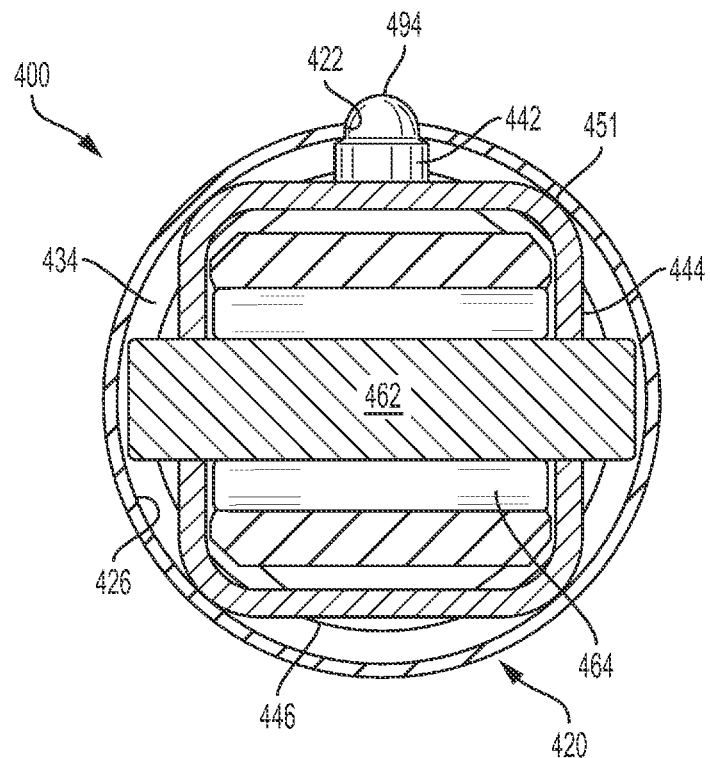
Figure 19D:
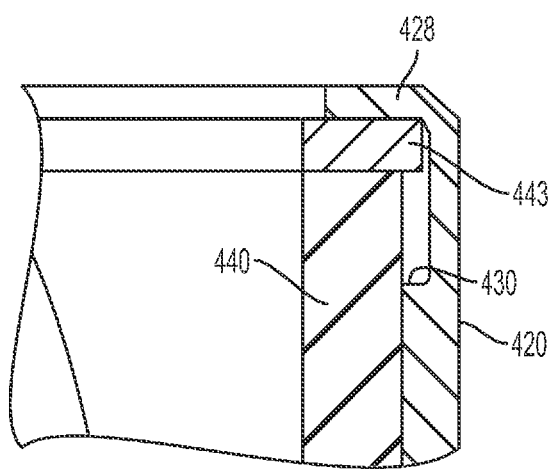
Figure 20A:
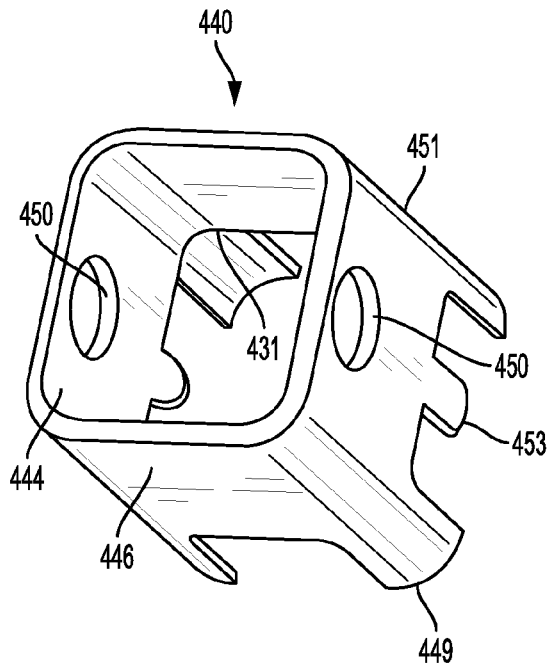
FIGS. 20A and 20B are perspective views of an inner cup of the follower mechanism shown in FIGS. 17A and 17B.
Figure 20B:
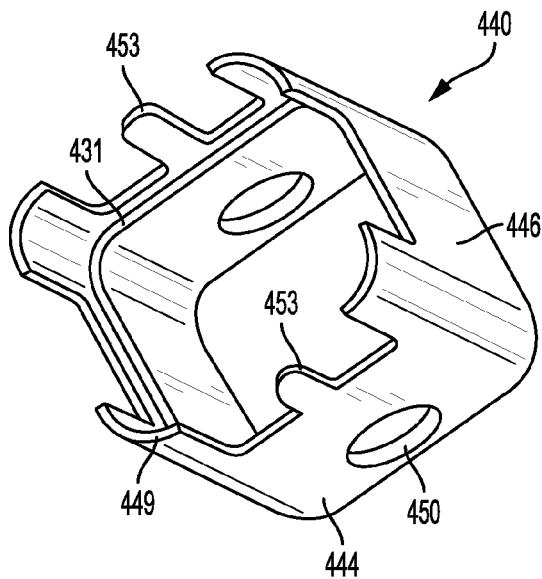
Figure 23:
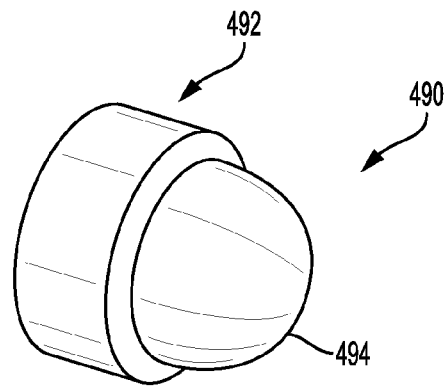
FIG. 23 is a perspective view of the alignment feature of the follower mechanism shown in FIGS. 17A and 17B.

Inner cup 440 preferably includes a side wall 445, having first and second pairs of parallel side walls 444 and 446, respectively, a pair of shaft apertures 450 defined by first side walls 444, and four legs 449 extending axially downwardly from the bottom edge of the side wall at its corners 451. As best seen in FIGS. 19A through 19C, when fully inserted in outer cup 420, the bottom surfaces of legs 449 of inner cup 440 rest directly on annular ledge 434. Alignment device 490 abuts a corresponding second wall 446 of inner cup so that alignment device 490 extends outwardly from alignment aperture 422. Referring additionally to FIG. 23, alignment device 490 includes a base portion 490 and semi-spherical projection 494 extending outwardly therefrom. Base portion 492 is larger than alignment aperture 422 so that alignment device 490 is retained between the outer and inner cups. Once fully inserted and rotationally positioned by way of alignment device 490, inner cup 440 is retained therein by folding annular lip 428 over inwardly, such as by crimping, spin curling, punch forming, etc., so that inner cup 440 is non-rotatably squeezed between annular lip 428 and annular lip 434. As best seen in FIG. 19C, the inner cup's pairs of first and second side walls 444 and 446 are perpendicular to each other, meeting at rounded corners 451. When fully assembled, annular lip 428 abuts inner cup 440 on upper surface 441 of these corners 451. Note, in alternate embodiments, a spacer 443 may be positioned between annular lip 428 and upper surface 441 of inner cup 440. Spacer 443 helps insure that an potential gaps between annular lip 428 and upper surface 441 are minimized. Spacer 443 is preferably formed from plastic or a like material. Additionally, inner cup 440 includes a ledge 431 defined on its inner surface adjacent the bottom edge of side wall 445, as well as a pair of retention tabs 453 extending axially therefrom. Ledge 431 and tabs 453 are configured to secure pallet 470 to inner cup 440, as discussed below.

Note, since outer cup 420 does not directly support shaft 462 of roller follower 460, it does not require the heat treatment processes that are typically performed on the outer cups of known follower mechanisms. As such, the folding/crimping operation performed on annular lip 428 is facilitated. However, in those applications where heat treatment of outer cup 420 is desired for wear purposes, the heat treatment process occurs after aperture 422 is formed for receiving alignment feature 442. Next, prior to folding, crimping, etc., annular lip 428 over inwardly, annular lip 428 is tempered to facilitate the operation and help prevent cracking.

Preferably, inner cup 440 is formed from a sheet metal blank by a stamping process, or drawing process, and is subjected to heat treatment processes as it directly supports shaft 462 of follower mechanism 400 and supports the cyclical force exerted by pump stem 190 (FIG. 7) on the bottom of pallet 470. Prior to the heat treatment processes, shaft apertures 450 are pierced in first side walls 444 of inner cup 440.

Figure 21:
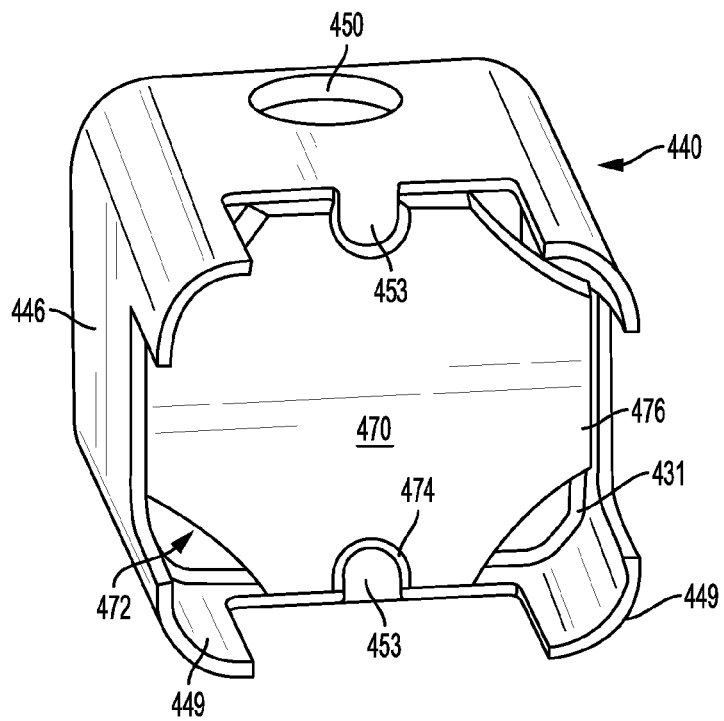
FIG. 21 is a perspective view of the inner cup and pallet of the follower mechanism shown in FIGS. 17A and 17B in the assembled state.
Figure 22A:
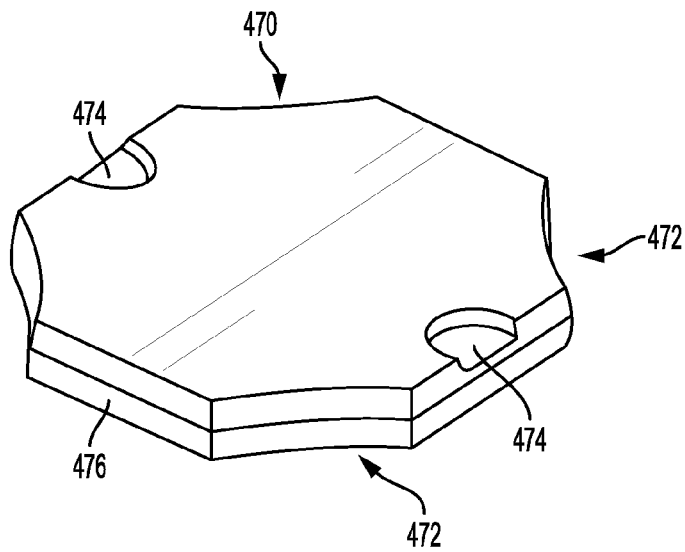
FIGS. 22A and 22B are perspective views of the pallet of the follower mechanism shown in FIGS. 17A and 17B.
Figure 22B:
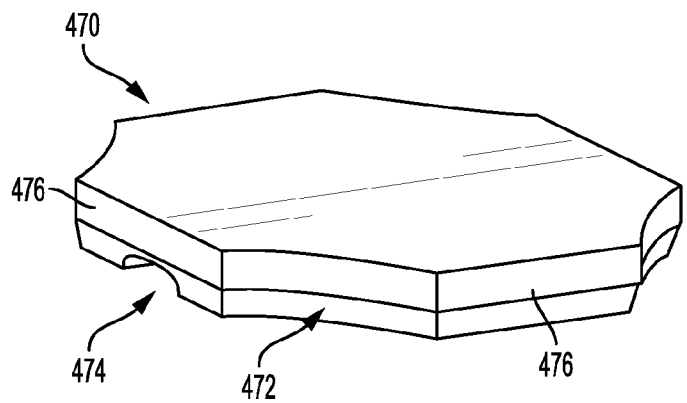

Referring to FIGS. 22A and 22B, pallet 470 includes a number of scalloped recesses 472 that allow lubrication flow through inner cup 440 when assembled. Between each pair of recesses 472, an abutment end 476 is formed that is received on ledge 431 of inner cup 440, as best seen in FIG. 21. As shown, two of the abutment ends 476 include retention recesses 474 formed on their lower surfaces, each retention recess being configured to receive a corresponding retention tab 453 of the inner cup 440. As such, prior to inserting inner cup 440 into outer cup during assembly, the top surfaces of abutment ends 476 of pallet are positioned in abutment with ledge of inner cup 440. Next, retention tabs 453 of inner cup 440 are bent radially inwardly until they are seated in the corresponding retention recesses 470 on the bottom of pallet 470, thereby securing pallet 470 to inner cup 440. Pallet 470 is perpendicular to longitudinal center axis 432 of follower mechanism 400 and facilitates the transfer of forces from follower mechanism 400 to the corresponding pump stem 190, or in the alternative, valve stem.

As shown, roller follower 460 includes shaft 462, an outer race 466, and a plurality of rollers 464 disposed therebetween such that race 466 is freely rotatable about shaft 462. Opposite ends of shaft 462 are received in shaft apertures 450 of inner cup 440 such that roller follower 460 is mounted to outer cup 420 of follower mechanism 400 by way of the inner cup. Preferably, the diameters of shaft apertures 450 are slightly larger than the diameter of shaft 462 such that shaft 462 is free to rotate within shaft apertures 450 during operation, although the opposing ends of shaft 462 can be staked, swaged, etc., to inner cup 440. Preferably, the flat inner surfaces of first side walls 444 of inner cup 440 act as bearing surfaces for the ends of rollers 464, although a pair of washers (not shown) may also be used if desired.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A follower mechanism movable within a bore along a longitudinal center axis of the bore, comprising:
   an outer cup having an inner surface and an outer surface defining a substantially cylindrical side wall, a first annular lip portion disposed at a first end of the side wall, and a ledge that is transverse to the longitudinal center axis of the follower mechanism;
   an inner cup including a side wall portion defining a pair of shaft apertures and a ledge that is transverse to a longitudinal center axis of the follower mechanism, the inner cup being disposed in the outer cup so that the first annular lip portion of the outer cup abuts a top surface of the side wall portion of the inner cup;
   a pallet having an outer perimeter, at least a portion of the outer perimeter being adjacent the ledge of the inner cup;
   a shaft having a first end and a second end, each of the first end and the second end being disposed in a corresponding one of the shaft apertures; and
   a roller follower rotatably received on the shaft such that a portion of the roller follower extends axially outwardly beyond the first annular lip portion of the outer cup.

2. The follower mechanism of claim 1, wherein the inner cup further comprises a pair of retention tabs, wherein the retention tabs extend radially inwardly so that the pallet is disposed between the ledge of the inner cup and the retention tabs.

3. The follower mechanism of claim 2, wherein the inner cup includes a plurality of legs extending axially downwardly from a bottom edge of a side wall portion, wherein the legs abut a second annular lip portion disposed at a second end of the side wall of the outer cup.

4. The follower mechanism of claim 3, wherein the side wall portion of the inner cup further comprises a first pair of parallel side wall portions and a second pair of parallel side wall portions that are perpendicular to each other.

5. The follower mechanism of claim 4, wherein the side wall portion of the inner cup is square.

6. The follower mechanism of claim 4, wherein the pair of shaft apertures are defined in the first parallel side wall portions of the inner cup.

7. The follower mechanism of claim 6, wherein the first and the second ends of the shaft are rotatably received in the shaft apertures.

8. The follower mechanism of claim 1, further comprising an alignment device that extends radially outwardly through an aperture defined in the side wall of the outer cup.

9. The follower mechanism of claim 1, wherein the roller follower comprises an outer race rotatably received about the shaft and a plurality of rollers disposed between the outer race and the shaft.

10. A follower mechanism movable within a bore along a longitudinal center axis of the bore, comprising:
    an outer cup having an inner surface and an outer surface defining a substantially cylindrical side wall, an annular lip portion disposed at a first end of the side wall, and an annular ledge disposed on the inner surface of the side wall adjacent the annular lip portion, the annular ledge being disposed in a plane that is transverse to a longitudinal center axis of the follower mechanism;

a pallet including an outer perimeter, the pallet being disposed in the outer cup such that a portion of the outer perimeter abuts the annular ledge of the outer cup;

an inner cup including a side wall defining a pair of shaft apertures, the inner cup being disposed in the outer cup so that a bottom edge of the side wall of the inner cup abuts the pallet and is non-rotatably fixed to the pallet by the annular lip of the outer cup which abuts an upper surface of the side wall of the inner cup;

a shaft having a first end and a second end, each of the first end and the second end being disposed in a corresponding one of the shaft apertures; and a roller follower rotatably received on the shaft such that a portion of the roller follower extends axially outwardly beyond the annular lip portion of the outer cup.

11. The follower mechanism of claim 10, wherein the side wall of the inner cup further comprises two opposed curved portions and a pair of parallel side wall portions extending therebetween.

12. The follower mechanism of claim 11, wherein each shaft aperture is defined in a corresponding parallel side wall portion of the inner cup.

13. The follower mechanism of claim 12, wherein the first and the second ends of the shaft are rotatably received in the shaft apertures.

14. The follower mechanism of claim 10, wherein the inner cup further comprises an alignment device that extends radially outwardly therefrom through an aperture defined in the side wall of the outer cup.

15. The follower mechanism of claim 14, wherein the alignment device further comprises a tab that is integrally formed with the inner cup.

16. The follower mechanism of claim 10, wherein the roller follower comprises an outer race rotatably received about the shaft and a plurality of rollers disposed between the outer race and the shaft.

17. The follower mechanism of claim 10, wherein the annular lip portion is thinner than the side wall of the outer cup in a radial direction with respect to the longitudinal center axis of the follower mechanism.

* * * * *